United States Patent
Jamrog et al.

(10) Patent No.: US 9,342,561 B2
(45) Date of Patent: May 17, 2016

(54) CREATING AND USING TITLES IN UNTITLED DOCUMENTS TO ANSWER QUESTIONS

(71) Applicant: International Business Machines Corporation, Armonk, NY (US)

(72) Inventors: Daniel M. Jamrog, Acton, MA (US); Jason D. LaVoie, Littleton, MA (US); Nicholas W. Orrick, Austin, TX (US); Alexander Pikovsky, Lexington, MA (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 14/150,272

(22) Filed: Jan. 8, 2014

(65) Prior Publication Data

US 2015/0193441 A1    Jul. 9, 2015

(51) Int. Cl.
*G06F 17/30* (2006.01)

(52) U.S. Cl.
CPC .................................. *G06F 17/3053* (2013.01)

(58) Field of Classification Search
USPC .................................. 707/723, 706, 748, 802
See application file for complete search history.

(56) References Cited

U.S. PATENT DOCUMENTS

| | | | |
|---|---|---|---|
| 8,122,042 B2 | 2/2012 | Pan et al. | |
| 8,280,888 B1 | 10/2012 | Bierner et al. | |
| 8,346,534 B2 | 1/2013 | Csomai et al. | |
| 8,346,754 B2 | 1/2013 | Ravikumar et al. | |
| 8,463,791 B1 | 6/2013 | Bierner et al. | |
| 2009/0287678 A1* | 11/2009 | Brown | G06F 17/30654 |
| 2011/0066587 A1 | 3/2011 | Ferrucci et al. | |
| 2011/0125734 A1 | 5/2011 | Duboue et al. | |
| 2011/0320444 A1* | 12/2011 | Yehaskel | G06Q 30/02 707/723 |
| 2012/0047131 A1* | 2/2012 | Billawala | G06F 17/30716 707/723 |
| 2012/0078891 A1 | 3/2012 | Brown et al. | |
| 2012/0084293 A1 | 4/2012 | Brown et al. | |
| 2012/0329032 A1 | 12/2012 | Fan et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0013220 A1* | 1/2014 | Ohguro | G06F 17/22 715/256 |
| 2014/0067784 A1* | 3/2014 | Wang | G06F 17/30887 707/706 |

OTHER PUBLICATIONS

Byron, et al., "Adapting Tabular Data for Narration", filed Mar. 15, 2013, U.S. Appl. No. 13/838,130.

(Continued)

*Primary Examiner* — Hung T Vy
(74) *Attorney, Agent, or Firm* — Stephen J. Walder, Jr.; Reza Sarbakhsh

(57) ABSTRACT

Mechanisms for ingesting a document from a corpus of documents for use by a Question and Answer (QA) system are provided. The mechanisms receive a document from a corpus of documents and generate one or more titles for the document based on an analysis of content of the document. The mechanisms generate score values for the titles based on a measure of a degree to which the titles represent the content of the document. The mechanisms store the score values in association with the titles as document metadata associated with the document and output the document and document metadata to the QA system. The QA system utilizes the document metadata and document to generate a candidate answer to an input question.

18 Claims, 5 Drawing Sheets

(56) References Cited

OTHER PUBLICATIONS

Byron, et al., "Discovering Relationships in Tabular Data", filed Jul. 1, 2013, U.S. Appl. No. 13/932,435.

Chu-Carroll, J. et al., "Finding Needles in the Haystack: Search and Candidate Generation", IBM Journal of Research and Development, vol. 56, No. 3/4, Paper 6, May/Jul. 2012, pp. 6:1-6:12.

High, Rob, "The Era of Cognitive Systems: An Inside Look at IBM Watson and How it Works", IBM Corporation, http://ip.com/pdf/redbook/REDP495500.pdf, 2012, 16 pages.

Jin, Rong et al., "A New Probabilistic Model for Title Generation", Proceedings of the 19th International Conference on Computational Linguistics, vol. 1, 2002, pp. 1-7.

Jin, Rong et al., "Learning to Select Good TitleWords: An New Approach Based on Reverse Information Retrieval", Carnegie Mellon University Research Showcase, Computer Science Department, School of Computer Science, Paper 1018, 2001, 9 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

CREATING AND USING TITLES IN UNTITLED DOCUMENTS TO ANSWER QUESTIONS

BACKGROUND

The present application relates generally to an improved data processing apparatus and method and more specifically to mechanisms for creating and using titles in untitled documents to answer questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for ingesting a document from a corpus of documents for use by a Question and Answer (QA) system. The method comprises receiving, by the data processing system, document from a corpus of documents. The method further comprises generating, by the data processing system, one or more titles for the document based on an analysis of content of the document and generating, by the data processing system, score values for the titles based on a measure of a degree to which the title represents the content of the document. Moreover, the method comprises storing, by the data processing system, the score values in association with the titles as document metadata associated with the document and outputting, by the data processing system, the document and document metadata to the QA system. The QA system utilizes the document metadata and document to generate a candidate answer to an input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
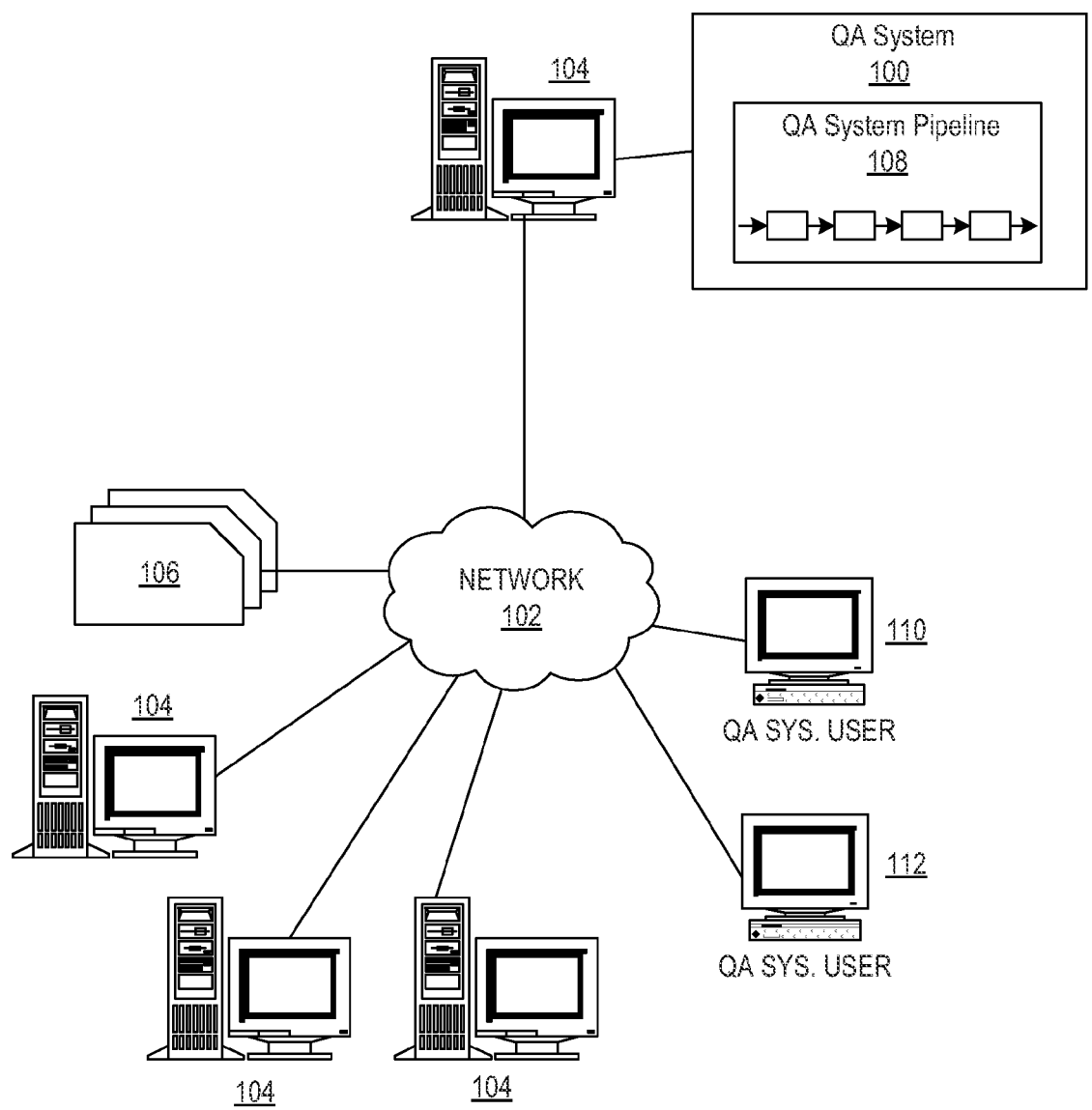
FIG. 1 depicts a schematic diagram of one illustrative embodiment of a question/answer creation (QA) system in a computer network.

The illustrative embodiments provide mechanisms for improving the operation of a Question and Answer (QA) system by providing title metadata in association with non-title oriented documents ingested by the QA system. That is, with the mechanisms of the illustrative embodiments, during ingestion of a corpus of documents, or at runtime, the ingestion engine of a QA system may mine the documents and create one or more titles for a given document, sections of a document, tables within documents, graphical images within the document, or the like. The titles may be scored according to a determined level of correctness and relevancy to the overall document with the titles and related scores being stored in association with the document, such as in metadata associated with the document. Thereafter, when the QA system is operating on input questions to generate candidate answers for the input questions, the QA system may utilize these titles and the related scores to generate candidate answers and determine a level of confidence associated with the candidate answers.

It has been determined by the inventors of the illustrative embodiments that title oriented documents (TODs) can provide valuable candidate answers in a QA system since titles often encompass information in themselves indicative of the candidate answers to many questions input into the QA system. However, not all input documents of a corpus or corpora used by a QA system have useful or informative titles, i.e. titles that can provide good candidate answers to a question submitted to the QA system. Thus, it would be beneficial to have an automated mechanism for generating such titles and associating them with documents that otherwise do not have such titles or have titles that are insufficient for use by the QA system when generating candidate answers to input questions.

With the mechanisms of the illustrative embodiments, during ingestion of a document from a corpus of documents used by a QA system, a title generation engine may analyze the document to determine if there are any titles associated with the document or to evaluate the titles associated with the document to determine if these titles are sufficient to provide valuable insights into generating candidate titles. This determination may analyze any existing titles in the content or metadata of the document to determine if there are titles present and then, if so, compare the titles to the content of the document to determine if there is content in the document that is not adequately covered by the content of the titles, such as by using a scoring technique as described herein for generating candidate titles. If there are no existing titles or if the titles are insufficient to cover all of the subject matter in the document, then the mechanisms of the illustrative embodiments may generate titles for the document. Alternatively, the mechanisms of the illustrative embodiments may generate titles for documents regardless of whether titles already exist for the document and whether they are sufficient or not to cover the document subject matter.

In order to generate titles for the document, natural language processing (NLP) techniques are applied to the document to identify sections of the document, determine various characteristics of these sections of the document, or of the document as a whole, which may be used to generate titles for the document, sections of the document, tables in the document, images in the document, or the like. For example, NLP techniques may be applied to the document to determine keyword frequency, identify proper nouns in the document, thesis or topic sentences, summarizations of target subsections, such as abstracts, conclusions, etc., or the like. In one illustrative embodiment table narration mechanisms may be used to generate titles for the document.

The mechanisms of the illustrative embodiments generate one or more titles for the document and then scores these titles using a trained evaluation model to evaluate the relevance and degree of coverage of the subject matter in the document provided by the title. Various trained evaluation model features including, but not limited to, frequency of terms occurring in the document and in the title, acronyms used in the title and the document, word popularity, whether the title is obtained from an abstract of the document, whether the title is obtained from identifiable key subsections of the document, and the like. The evaluation of the title results in a measure of the likelihood that the title will generate good candidate answer results based on the content of the document when the QA system operates on the document in response to an input question. The resulting scores or measures of relative importance of the titles may be used to generate a relative ranking of the titles which may then be applied when calculating confidence measures for candidate answers as described hereafter. The titles and their corresponding measures of relative importance may be stored in metadata associated with the document and may be retrieved by the QA system when performing its functions in answering input questions.

Thus, the mechanisms of the illustrative embodiments, generate titles for non-titled documents or insufficiently titled documents. The titles are evaluated to determine their relative importance based on an evaluation model that looks at various characteristics indicative of the degree of coverage and relevance of the title to the subject matter within the document and thus, a likelihood that the title will generate good candidate answer results. This information may then be used to enhance the operation of a QA system by providing titles and for further weighting candidate answers based on the scores or measures associated with the titles from which the candidate answers are generated.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
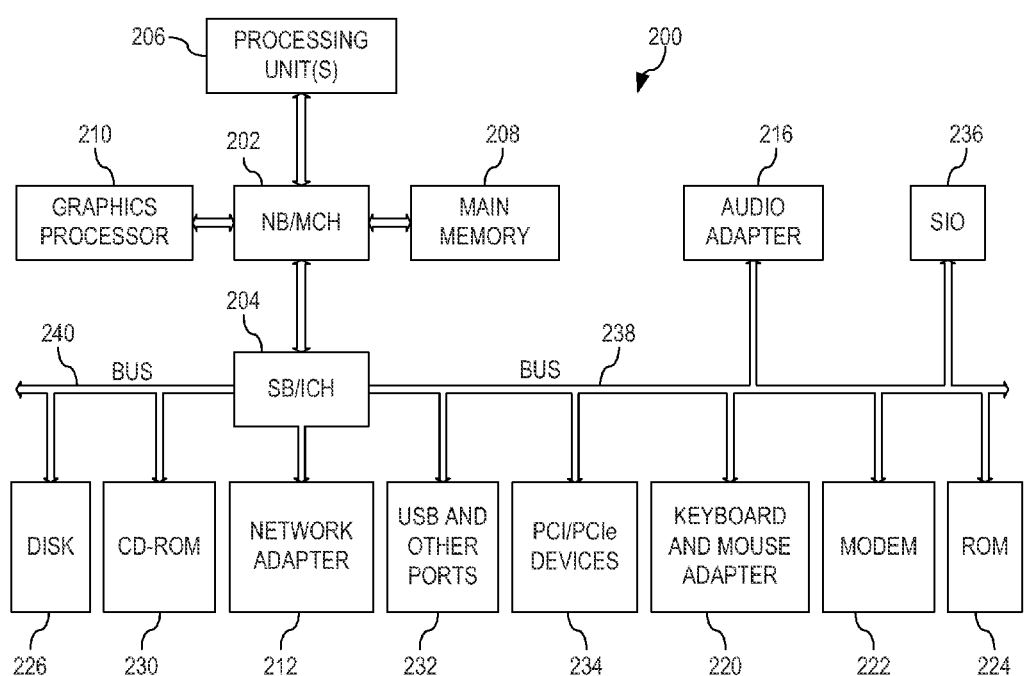
FIG. 2 is a block diagram of an example data processing system in which aspects of the illustrative embodiments may be implemented.
Figure 3:
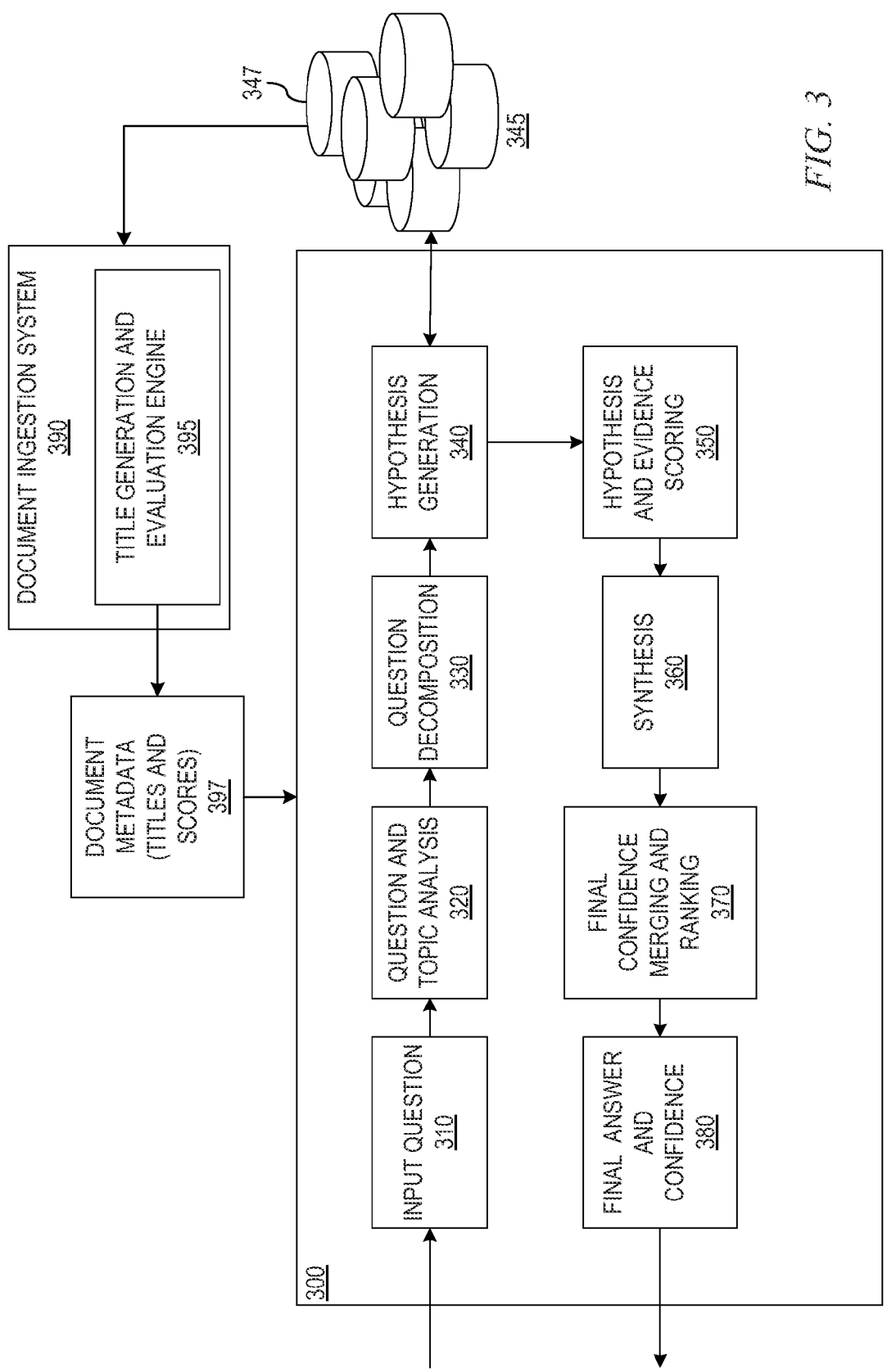
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to generating titles for non-titled or insufficiently titled documents during ingestion of the documents for use by the QA system and for using scores associated with the generated titles to augment the calculation of confidence scores for candidate answers.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

In FIG. 3, in accordance the illustrative embodiments, as part of stage 350, the reasoning algorithms may further analyze document metadata 397 (comprising titles and related scores, or weights, indicative of a measure of a degree of representativeness of the title to the content of the document) associated with documents of the corpus 347, or corpora 345, to determine weightings to be applied during the scoring of the candidate answers based on whether the candidate answers were generated fully or partially from the titles associated with the document. The document may originally be present within the corpus 347 as a non-title oriented document, or a document having insufficient titles for the document. As a result, the mechanisms of the illustrative embodiments may generate titles for the document, evaluate the generated titles to determine a measure of representativeness of the title to the content of the document, and store these titles and associated measures (or scores) in metadata associated with the document. In one illustrative embodiment, the generation of titles and evaluation of the generated titles to generate document metadata 397 is performed in an automated process by title generation and evaluation engine 395 of the document ingestion system 390. It is these titles and measures that may be used during candidate answer generation and generation of the scores or confidence measures associated with the candidate answers during stage 350.

When generating the confidence measures or scores associated with candidate answers, the measure of importance of the title from which the candidate answer was generated may be applied as a weighting factor in the confidence measure calculation. Thus, if a candidate answer is generated from a title having a relatively high measure of importance when compared to other titles of the document, then the weighting factor will be relatively higher, resulting in a higher confidence measure for the candidate answer. Similarly, if a candidate answer is generated from a title having a relatively low measure of importance when compared to other titles of the document, then the weighting factor will be relatively smaller, resulting in a lower confidence measure for the candidate answer. As mentioned above, through the title generation process, multiple titles may be generated for a document, a section of a document, a table, an image, or the like. Each of these titles may be the source of candidate answers and thus, some candidate answers will be more heavily weighted than others even though they are generated from the same document.

Figure 4:
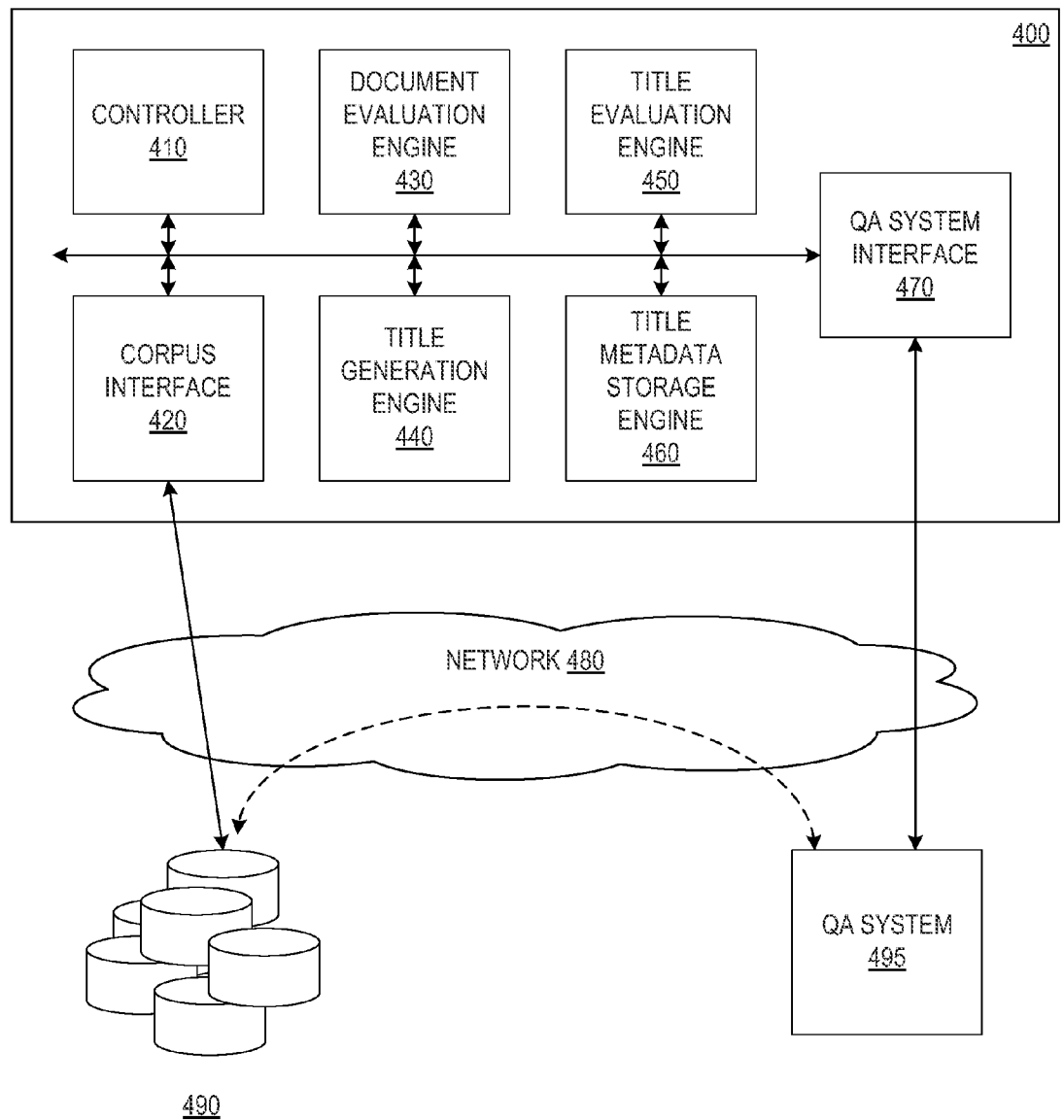
FIG. 4 is an example block diagram illustrating the primary operational elements of a title generation and evaluation mechanism in accordance with one illustrative embodiment.

FIG. 4 is an example block diagram illustrating the primary operational elements of a title generation and evaluation mechanism in accordance with one illustrative embodiment. The elements shown in FIG. 4 may be implemented in hardware, software executing on one or more data processing devices, or any combination of hardware and software. In one illustrative embodiment, the elements shown in FIG. 4 are implemented as software instructions executed on one or more processors of one or more data processing systems or devices. The elements shown in FIG. 4 may be integrated with a QA system or may be part of a separate computing device from the computing device(s) upon which the QA system is implemented. In either case, the title generation and evaluation mechanisms is in communication with a computing system or storage system that stores a corpus of documents for processing and further is in communication with the QA system so as to provide ingested document data to the QA system for loading into memory or other storage of the QA system so that the QA system may operate on the ingested document data.

As shown in FIG. 4, the primary operational elements of a title generation and evaluation mechanism comprises a controller 410, a corpus interface 420, a document evaluation engine 430, a title generation engine 440, a title evaluation engine 450, and a title metadata storage engine 460, QA system interface 470. The controller 410 controls the overall operation of the title generation and evaluation mechanism 400 and orchestrates the operation of the other elements 420-470. The corpus interface 420 provides a data communication pathway through which the title generation and evaluation mechanism 400 obtains document data from a corpus of documents 490. The corpus interface 420 may be coupled to one or more networks 480 through which the title generation and evaluation mechanism 400 is able to access the computing devices and storage devices that store the documents of the corpus 490.

The document data obtained from the corpus 490 via the corpus interface 420 is provided to the document evaluation engine 430 to determine if the document data comprises titles and if those titles are sufficient for providing candidate answers by a QA system based on the content of the document. The determination of whether a document has titles or not may comprise looking at the metadata of the document to determine if any title metadata is included. Title metadata may be designated, for example, by special tags, identifiers, or the like, within the metadata of the document. Moreover, logic of the document evaluation engine 430 may analyze the content and format of the document to determine if there are any patterns with regard to content and/or format that are indicative of a title of the document, a section of the document, a table within the document, an embedded image, or the like.

If the document data does not comprise any titles, then the document data may be forwarded to the title generation engine 440 for generating one or more titles for the document, sections within the document, tables within the document, embedded images, or the like. If the document data does comprise one or more titles, then these titles may be evaluated to determine if they are sufficient to represent the subject matter of the document with regard to the operation of the QA system when generating candidate answers to input questions. The evaluation of the existing titles of the document may be similar to the evaluation performed when scoring dynamically generated titles for the document as described hereafter. That is, various characteristics of the title may be compared with the content of the document to determine if there is a sufficient level of representation of the contents of the document by the existing titles. The level of sufficiency may be measured against one or more threshold values. That is, a measure of the degree of representation of the existing titles may be calculated using any formulation suitable to the implementation and then the resulting measure may be compared against the one or more thresholds to determine if the one or more thresholds are met or exceeded by the measure of the degree of representation. If one or more titles of the document meet or exceed these one or more thresholds, then it may be determined that no further title generation is necessary. Alternatively, dynamic title generation using the mechanisms of the illustrative embodiments may instead be performed with regard to every document in the corpus 490 without regard to whether the documents have titles or whether the titles sufficiently represent the content of the document.

In evaluating titles of a document, both existing titles in the title metadata or the content of the document, or dynamically generated titles that are generated using the mechanisms of the illustrative embodiments, various characteristics, patterns of content, and the like, may be used to generate a measure of the degree of relatedness or representation of the subject matter of the document to the title. For example, each word or term in the title may be compared against the content of the document to determine how often the term appears in the body of the document. Acronyms are often indicative of important concepts in a document and thus, if the title contains an acronym, it is more likely to be descriptive of the content of the document. Table structures and images in documents tend to be representative of the concepts and subject matter of the document and are illustrative of the statements therein. Thus, titles associated with table structures and images may be more representative of the content of a document than other types of titles. Titles associated with certain sections of a document may be more representative of the document as a whole than other titles, e.g., titles associated with an abstract of the document, summary of the document, or other key subsections of the document.

Furthermore, semantic relationships between terms in the title, as they are found in the body of the document, may be considered and evaluated to determine a measure of representation of the title. For example, if a term in the title is often found in the body of the document as the focus of a statement, topic of a paragraph, found in multiple titles of sections of the document, or the like, then titles containing that term, phrase, etc. may be given a greater measure of representation than other titles that do not contain that term, phrase, etc. Other characteristics and patterns of content may be used without departing from the spirit and scope of the illustrative embodiments. Moreover, any combination of such characteristics and patterns of content may be used without departing from the spirit and scope of the illustrative embodiments.

In some illustrative embodiments, the evaluation of titles may involve relating information obtained from multiple documents within the corpus. For example, statistics regarding the frequency of occurrence of certain key terms, phrases, or the like, may be maintained by the controller 410 across a plurality of documents and used to evaluate titles in which these key terms are present. Terms or phrases having a high frequency of use across documents are indicative of important terms to describing the subject matter of the domain of the corpus. Titles containing such terms or phrases are likely to be more descriptive and representative of the content of the documents with which they are associated and thus, may be given a higher measure of representativeness. Other statistics and characteristics of titles that may reflect the quality of the document as a source, statistics regarding average title length, whether titles have proper nouns, contain declarative statements, are in the form of a question, or the like, may be used to evaluate titles in accordance with the illustrative embodiments.

The logic of the document evaluation engine 430 may identify these and other characteristics and relationships between portions of titles (if any) of documents and the content of the documents themselves and generate a quantifiable measure of the degree of representativeness of the title to the content of the document with which it is associated. This quantifiable measure may be compared against one or more thresholds to determine if the title is sufficient to represent the content of the document with regard to generation of candidate answers by a QA system. If no titles are present in the document, or if there is not a required number of titles associated with the document that have a measure meeting or exceeding the one or more thresholds, then the title generation engine 440 may be invoked to generate one or more titles for the document, sections of the document, table structures within the document, images embedded in the document, or the like.

The title generation engine 440 may enlist any number of title generation algorithms to generate titles for the document as a whole or subsections of the document. An example of one type of title generation logic that may be implemented by the title generation engine 440 may be the title generation mechanism described in U.S. Pat. No. 8,280,888 issued to Bierner et al. and entitled "Method and Apparatus for Creation of Web Document Titles Optimized for Search Engines." With this mechanism, a document is received, a maximum number of characters for the title is determined, and phrasal analysis is applied to the document to identify topics included in the document and computing candidate titles based on the identified topics. The candidate titles are sorted based on the number of topics in each candidate title and the candidate title with the largest number of topics is selected as the optimized title for the document.

In addition, the title generation engine 440 may utilize other title generation algorithms in addition to, or in replacement of, the phrasal analysis and topic analysis mechanism described above. For example, in some illustrative embodiments, table narration mechanisms may be used to narrate table structures present within the document and use the resulting table narrations to generate titles for the table structures which can then be used as titles for the document as well.

Examples of table narration mechanisms are described in co-pending and commonly assigned U.S. patent application Ser. Nos. 13/838,130 and 13/932,435, which are incorporated herein by reference.

Moreover, phrasal analysis may be used to analyze text associated with, or in close proximity to, images embedded in documents so as to extract titles for the images from the text. Any of these, or any other, title generation algorithms may be used to analyze the content of the document to generate titles for the document, and any combination of these or any other title generation algorithms may be used without departing from the spirit and scope of the illustrative embodiments.

It should be appreciated that the title generation engine 440 may generate a plurality of titles for a single document and each of these titles may be stored in association with the document, such as in the metadata associated with the document. Thus, where the mechanisms of U.S. Pat. No. 8,280,888 generates a single title for a web document, the illustrative embodiments generate a plurality of titles for the document and maintain each of these titles in association with the document for later use by a QA system. Moreover, as discussed hereafter, these titles each have a score associated with them that is stored in association with the title and the document so as to facilitate the generation and evaluation of candidate answers by the QA system.

The titles generated by the title generation engine 440 are provided to the title evaluation engine 450 for scoring. The scoring may be done in a similar manner as previously described in relation to the operation of the document evaluation engine 430 evaluating existing titles in documents. That is, the various characteristics and patterns of content of the title are compared to the content of the document, or documents in the corpus, to determine a measure of representativeness of the title to the document. This measure is a quantifiable value that may be compared against one or more thresholds or otherwise used when generating a measure of confidence in a candidate answer, as described hereafter. The scores essentially operate as weights to be applied to candidate answers generated from corresponding titles. Thus, in the logic calculating the confidence measure or score for a candidate answer, the weights may be applied during the calculation of one or more factors of the confidence measure and thereby weight the confidence measure or score for the candidate answer in accordance with the measure of representativeness of the title to the document.

The resulting scores generated by the evaluation engine 450 may be stored in association with their corresponding titles in the metadata associated with the document. Thus, a single document may have multiple titles associated with it and each of these titles may have an associated score or measure of representativeness of the title relative to the content of the document. This title and score information may provided to the title metadata storage engine 460 which generates a metadata file that is associated with the document, or embeds the metadata into the document itself, or otherwise associates the metadata with the document such that it may be retrieved by a QA system when generating candidate answers to input questions. This metadata may be stored in association with the document in a storage device, memory, or the like, associated with the QA system 495 via the QA system interface 470. As a result, the QA system 495 may retrieve this document and metadata information from the storage device, memory, or the like, when generating a candidate answer to an input question and then use the titles and associated scores to weight the confidence measures associated with candidate answers generated based on these titles.

Figure 5:
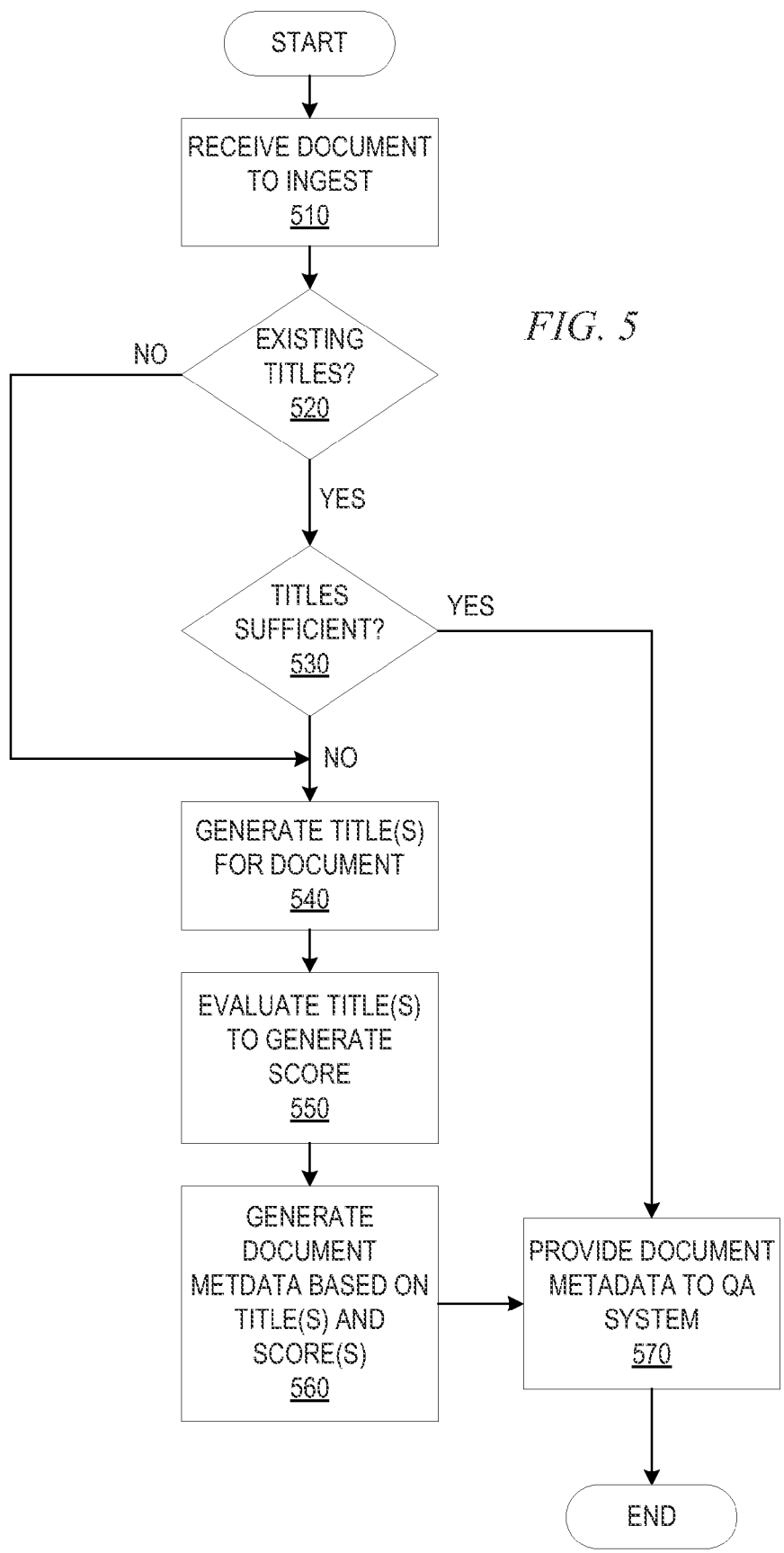
FIG. 5 is a flowchart outlining an example operation of a title generation and evaluation mechanism in accordance with one illustrative embodiment.

FIG. 5 is a flowchart outlining an example operation of a title generation and evaluation mechanism in accordance with one illustrative embodiment. As shown in FIG. 5, the operation starts by receiving a document to be ingested (step 510). The document is analyzed to determine if there are any existing titles associated with the document (step 520). If there are existing titles associated with the document, the titles are analyzed to determine if the titles are sufficiently representative of the content of the document (step 530). If the titles are sufficiently representative of the content of the document, then the operation jumps to step 570. If the titles are not sufficiently representative of the content of the document, or there are no titles in the document, the operation then generates one or more titles for the document (step 540).

The titles that are generated for the document are evaluated to determine a measure of representativeness, or score, of the title to the content of the document (step 550). The scores for the titles are stored in association with the title in metadata associated with the document (step 560). The document and metadata are provided to a QA system for use in answering input questions (step 570). The operation then terminates. As discussed above, the QA system, in using the document and metadata, weights factors of a calculation of the candidate answer's confidence in accordance with the score associated with the title from which the candidate answer was generated.

It should be noted that while the illustrative embodiments are described in terms of a pre-processor ingestion operation in which documents are ingested prior to being utilized by the QA system to answer input questions, the illustrative embodiments are not limited to such. Rather, the illustrative embodiments may implement the mechanism for title generation and evaluation during runtime as the QA system is answering input questions. For example, the QA system may comprise a plurality of QA system pipelines. Some of the QA system pipelines may be provided for answering input questions, such as described above with regard to FIG. 3. Other QA system pipelines may be dedicated to performing parallel processing of documents of the corpus for purposes of generating and evaluating titles. Thus, as a QA system ingests a document during runtime, the document may be processed for answering an input question and, in a parallel manner, may be analyzed to generate and evaluate one or more titles for the document.

For example, the QA system has access to the latest state of the document title metadata. Thus, a question may be asked just prior to the system analyzing the document for titles and updating the document's title metadata and the processing of this question will look to the previously known titles for the document. The next question received may be processed using the latest updated titles, generated in parallel with the answering of the previous input question, which may be different from the previously known titles.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for ingesting a document from a corpus of documents for use by a Question and Answer (QA) system, the method comprising:

receiving, by the data processing system, a document from a corpus of documents;

determining, by the data processing system, whether or not the document comprises one or more titles;

in response to the document comprising one or more titles, evaluating, by the data processing system, the one or more titles to determine if the one or more titles sufficiently represent content of the document;

in response to either the document not comprising one or more titles or the one or more titles not being sufficient to represent the content of the document:

generating, by the data processing system, a title for the document based on an analysis of content of the document;

generating, by the data processing system, a score value for the title based on a measure of a degree to which the title represents the content of the document; and storing, by the data processing system, the score value in association with the title as document metadata associated with the document; and outputting, by the data processing system, the document and document metadata to the QA system, wherein the QA system utilizes the document metadata and document to generate a candidate answer to an input question, wherein evaluating the one or more titles to determine if the one or more titles sufficiently represent the content of the document comprises:

comparing characteristics of the one or more titles to subject matter content of the document;

generating a score for each title in the one or more titles based on results of the comparison;

comparing each score for each title to one or more thresholds representing sufficiency of titles; and determining that the one or more titles sufficiently represent the content of the document in response to at least one of the scores having a predetermined relationship to the one or more thresholds.

2. The method of claim 1, wherein generating a title for the document based on an analysis of content of the document comprises generating a plurality of titles for the document, and wherein generating a score value for the title comprises generating a score value for each of the plurality of titles for the document, and wherein each of the plurality of titles and associated score values are stored in the document metadata and are used by the QA system to generate the candidate answer to the input question.

3. The method of claim 1, wherein generating a title for the document based on an analysis of content of the document comprises:
   performing a natural language processing operation on content of the document to extract characteristics of the document; and
   generating a title for the document based on the extracted characteristics of the document.

4. The method of claim 3, wherein the natural language processing operation comprises at least one of determining keyword frequency, identifying proper nouns in the document, identifying thesis or topic sentences in the document, identifying summarizations of document subsections, or performing table heading analysis.

5. The method of claim 1, wherein generating a score value for the title based on a measure of a degree to which the title represents the content of the document comprises utilizing a trained evaluation model to evaluate a relevance and degree of coverage of a subject matter of the document of the title.

6. The method of claim 5, wherein the trained evaluation model evaluates the relevance and degree of coverage based on evaluation model features, and wherein the evaluation model features comprise at least one of a frequency of terms occurring in the document and in the title, acronyms used in the title and the document, word popularity, whether the title is obtained from an abstract of the document, or whether the title is obtained from identifiable key subsections of the document.

7. The method of claim 1, wherein the method is implemented by a first pipeline of the QA system in parallel with an operation of a second pipeline of the QA system that is used to answer an input question using the corpus of documents.

8. The method of claim 1, further comprising:
   receiving an input question to the QA system for generation of an answer to the input question;
   generating, by the QA system, a plurality of candidate answers from a search of titles in document metadata for documents of the corpus of documents;
   generating, by the QA system, a confidence score for each candidate answer in the plurality of candidate answers based on a score associated with a title that is a source of the candidate answer;
   ranking, by the QA system, candidate answers in the plurality of candidate answers based on the generated confidence scores for the candidate answers; and
   selecting an answer to the input question from the ranked candidate answers.

9. The method of claim 1, wherein comparing characteristics of the one or more titles to content of the document comprises at least one of:
   determining a frequency of occurrence of a term, in the one or more titles, within the content of the document;
   determining if an acronym in the one or more titles is present in the content of the document;
   determining if the title is associated with a table or image within the content of the document; or
   determining a frequency of occurrence of a term in the one or more titles being a focus of a statement, a topic of a paragraph, or being found in other titles of sections of the content of the document.

10. The method of claim 1, wherein the QA system utilizes the document metadata and document to generate a candidate answer to an input question by weighting a confidence value associated with candidate answers generated from the title according to the score value.

11. A computer program product comprising a computer readable storage medium having a computer readable program stored therein, wherein the computer readable program, when executed on a computing device, causes the computing device to:
   receive a document from a corpus of documents;
   determine whether or not the document comprises one or more titles;
   in response to the document comprising one or more titles, evaluate the one or more titles to determine if the one or more titles sufficiently represent content of the document;
   in response to either the document not comprising one or more titles or the one or more titles not being sufficient to represent the content of the document:
      generate a title for the document based on an analysis of content of the document;
      generate a score value for the title based on a measure of a degree to which the title represents the content of the document; and
      store the score value in association with the title as document metadata associated with the document; and
   output the document and document metadata to a Question and Answer (QA) system, wherein the QA system utilizes the document metadata and document to generate a candidate answer to an input question, wherein evaluating the one or more titles to determine if the one or more titles sufficiently represent the content of the document comprises:
   comparing characteristics of the one or more titles to subject matter content of the document;
   generating a score for each title in the one or more titles based on results of the comparison;
   comparing each score for each title to one or more thresholds representing sufficiency of titles; and
   determining that the one or more titles sufficiently represent the content of the document in response to at least one of the scores having a predetermined relationship to the one or more thresholds.

12. The computer program product of claim 11, wherein the computer readable program further causes the computing device to generate a title for the document based on an analysis of content of the document at least by generating a plurality of titles for the document, and wherein the computer readable program further causes the computing device to generate a score value for the title at least by generating a score value for each of the plurality of titles for the document, and wherein each of the plurality of titles and associated score values are stored in the document metadata and are used by the QA system to generate the candidate answer to the input question.

13. The computer program product of claim 11, wherein the computer readable program further causes the computing device to generate a title for the document based on an analysis of content of the document at least by:
   performing a natural language processing operation on content of the document to extract characteristics of the document; and
   generating a title for the document based on the extracted characteristics of the document.

14. The computer program product of claim 13, wherein the natural language processing operation comprises at least one of determining keyword frequency, identifying proper nouns in the document, identifying thesis or topic sentences in the document, identifying summarizations of document subsections, or performing table heading analysis.

15. The computer program product of claim 11, wherein the computer readable program further causes the computing device to generate a score value for the title based on a measure of a degree to which the title represents the content of the document comprises utilizing a trained evaluation model to evaluate a relevance and degree of coverage of a subject matter of the document of the title, and wherein the trained evaluation model evaluates the relevance and degree of coverage based on evaluation model features, and wherein the evaluation model features comprise at least one of a frequency of terms occurring in the document and in the title, acronyms used in the title and the document, word popularity, whether the title is obtained from an abstract of the document, or whether the title is obtained from identifiable key subsections of the document.

16. The computer program product of claim 11, wherein the computer readable program is executed by the computing device in a first pipeline of the QA system in parallel with an operation of a second pipeline of the QA system that is used to answer an input question using the corpus of documents.

17. The computer program product of claim 11, wherein the computer readable program further causes the computing device to:
receive an input question to the QA system for generation of an answer to the input question;
generate, by the QA system, a plurality of candidate answers from a search of titles in document metadata for documents of the corpus of documents;
generate, by the QA system, a confidence score for each candidate answer in the plurality of candidate answers based on a score associated with a title that is a source of the candidate answer;
rank, by the QA system, candidate answers in the plurality of candidate answers based on the generated confidence scores for the candidate answers; and
select an answer to the input question from the ranked candidate answers.

18. An apparatus comprising:
a processor; and
a memory coupled to the processor, wherein the memory comprises instructions which, when executed by the processor, cause the processor to:
receive a document from a corpus of documents;
determine whether or not the document comprises one or more titles;
in response to the document comprising one or more titles, evaluate the one or more titles to determine if the one or more titles sufficiently represent content of the document;
in response to either the document not comprising one or more titles or the one or more titles not being sufficient to represent the content of the document:
generate a title for the document based on an analysis of content of the document;
generate a score value for the title based on a measure of a degree to which the title represents the content of the document; and
store the score value in association with the title as document metadata associated with the document; and
output the document and document metadata to a Question and Answer (QA) system, wherein the QA system utilizes the document metadata and document to generate a candidate answer to an input question, wherein evaluating the one or more titles to determine if the one or more titles sufficiently represent the content of the document comprises:
comparing characteristics of the one or more titles to subject matter content of the document;
generating a score for each title in the one or more titles based on results of the comparison;
comparing each score for each title to one or more thresholds representing sufficiency of titles; and
determining that the one or more titles sufficiently represent the content of the document in response to at least one of the scores having a predetermined relationship to the one or more thresholds.

* * * * *